United States Patent [19]

Tulleners

[11] 4,319,164
[45] Mar. 9, 1982

[54] POWER FACTOR COMPENSATING ELECTROLUMINESCENT LAMP DC/AC INVERTER

[75] Inventor: Harry W. Tulleners, Urbana, Ohio

[73] Assignee: Midland-Ross Corporation, Cleveland, Ohio

[21] Appl. No.: 236,368

[22] Filed: Feb. 20, 1981

Related U.S. Application Data

[63] Continuation-in-part of Ser. No. 61,929, Jul. 30, 1979.

[51] Int. Cl.³ .................... H05B 37/02; H05B 39/04; H05B 41/36
[52] U.S. Cl. .................................. 315/219; 315/105; 315/204; 315/247; 315/169.3; 315/DIG. 5; 331/113 A
[58] Field of Search ............... 315/101, 105, 203, 204, 315/205, 219, 247, 104, 169.3, DIG. 5; 331/113 A

[56] References Cited

U.S. PATENT DOCUMENTS

| | | | |
|---|---|---|---|
| 3,059,147 | 10/1962 | Sack | 315/244 X |
| 3,149,291 | 9/1964 | Massey | 331/113 A |
| 3,159,800 | 12/1964 | Massey | 331/113.1 |
| 3,173,057 | 3/1965 | Thornton, Jr. | 315/244 |
| 3,749,977 | 7/1973 | Sliker | 315/169.1 |
| 4,005,335 | 1/1977 | Perper | 315/219 |
| 4,104,715 | 8/1978 | Lawson, Jr. | 315/DIG. 5 |
| 4,127,797 | 11/1978 | Perper | 315/DIG. 5 |

*Primary Examiner*—Saxfield Chatmon, Jr.
*Attorney, Agent, or Firm*—Harlan E. Hummer

[57] ABSTRACT

Described is a circuit to invert DC to AC for the operation of electroluminescent lamps. A primary winding of a transformer is in series with a power source and the input or output of the switching device. The output of the switching device is connected back to the power source. The secondary winding of the transformer is in series with an electroluminescent lamp and the controller side of the switching device. The secondary winding doubles as both the output to the electroluminescent lamp and the feedback winding to the controller side of the switching device. The electroluminescent lamp doubles both as the load and limiting impedance to the controller side of the switching device. Also described is a unique device for dimming the electroluminescent lamp.

5 Claims, 11 Drawing Figures

POWER FACTOR COMPENSATING ELECTROLUMINESCENT LAMP DC/AC INVERTER

BACKGROUND OF THE INVENTION

This application is a continuation-in-part of copending application Ser. No. 061,929 filed July 30, 1979.

This invention relates to the field of electroluminescent lamps; more particularly, the invention relates to a power factor compensating electroluminscent DC to AC inverter circuit.

In its most basic form, an electroluminescent lamp or cell contains a layer of electroluminescent phosphor compound sandwiched between a pair of conductive electrode coatings or layers at least one of which is transparent. In the electroluminescent cell art, a plurality of additional layers for various purposes can be added to this basic configuration. From an electrical point of view, the electroluminescent electrically active cell comprises two electrodes sandwiching the electroluminescent phosphor and behaves like a capacitor.

U.S. Pat. No. 3,173,057—Electroluminescent Combination by W. A. Thorton, Jr.—recognizes that electroluminescent lamps display a capacitance which decreases as the device is operated, thereby decreasing the capacitive reactance of the device. Thornton in recognizing this discloses a circuit in which the electroluminescent cell and the inductor are chosen with respect to one another so that they form a series resonant circuit. This series resonant circuit is actuated by a potential source which is adopted to deliver a predetermined potential of a predetermined frequency. When the device is initially operated, the components of the series resonant circuit have such relative values of resistance and reactance that the potential developed across the inductor differs by a predetermined amount from the potential developed across the electroluminescent device. During operation, the normal decrease in the light output of the electroluminescent device portion of the series resonant circuit is modified by the change in the effective energizing potential which is developed across the electroluminescent device, as the operation of the series resonant circuit is shifted with respect to a condition of resonance because of the decrease in capacitance of the electroluminescent device.

U.S. Pat. No. 3,749,977—Electroluminescent Device by Sliker—also recognizes the capacitive properties of electroluminescent lamps. Oscillator circuits for use with alternating current sources are shown which result in reduced power requirements. This circuit is for use with an alternating current source. The lamp load is in series with the primary transformer winding of the oscillator circuit.

Electrical ballast circuits are known to be used to improve the power factor of gaseous discharge lamps. Generally, these circuits use a combination of inductors and capacitors. In U.S. Pat. No. 4,123,690—Discharge Lamp Ballast Circuit by Osteen, an electric ballast circuit of improved power factor for operating gas discharge lamps is disclosed. Two discharge lamps are respectively connected to two inductively coupled induction coils for obtaining high power factor without the use of capacitors. By virtue of the circuit arrangement, the current supplied to the two lamps is substantially out of phase and an improvement in power factor is obtained by virtue of the phase difference between these currents. The current through one lamp leading the current through the second lamp serves, in effect, as a capacitor to the line.

U.S. Pat. No. 4,145,636—Fluorescent Lamp Driving Circuit by Doi—discloses a circuit for driving a fluorescent lamp with a direct current source. The circuit includes a transistor and a transformer, the secondary coil of which is divided into a feedback portion and a second portion containing the lamp load. One filament of the lamp serves as part of the bias resistance in series with the feedback portion and at the same time is heated by the base current flowing through the base emitter-junction of the transistor.

U.S. Pat. No. 3,821,635—Capacitor Charging Circuit by Kimmel et al, although not related to lamp loads, discloses a power factor control circuit associated with the power supply having a solid state switch in series with the primary transformer winding, a feedback circuit for the control gate of the solid state switch extending from the load connecting the secondary winding of the transformer. In operation, the power factor control circuit reflects back to the current regulation circuit output, the impedance of the capacitor as it is charging and is responsive to a predetermined condition thereof for changing the apparent resistance reflected, in order to maximize the circuit power factor. The purpose of this circuit is the repeatedly charging and discharging of the capacitor for use in a flashtube apparatus or the like. It effectively changes AC to DC.

U.S. Pat. No. 4,068,158—High Efficiency DC Voltage Regulator by Hickes et al, discloses a high efficiency DC voltage regulator in which there is a transformer with a primary winding in series with a switching transistor which is provided with a low impedance source of bias current. The bias current for the transistor is derived by storing energy supplied by the secondary winding of the transformer with a capacitor or other energy storage means during a nonconducting portion of this switching cycle. The stored energy is transferred to the base of the transistor in the form of a bias current. This additional bias current reduces the current drawn through the bias resistors thereby reducing the energy consumption in the bias resistors.

Electroluminescent lamps are used with alternating current. Certain applications, such as in motor vehicles and aircraft, require that electroluminescent lamps be used where only a direct current is available. In these applications, inverters that are generally known in the art can be used to translate the direct current to an alternating current. The unique properties of electroluminescent lamps make them very inefficient when used with these conventional inverters. For one thing, electroluminescent lamps are highly capacitive, resulting in power factors as low as about 0.15 to about 0.4. Another problem with electroluminescent lamps is that there is an exponential decay in light output. With the decay in light output, there is an additional lowering in the power factor. Therefore, we are dealing with an element in the circuit having varying properties and which further causes a low power factor.

Most low cost transistor inverters have the transistor base drive provided by a special feedback winding with a resistance network, an R-C network, or resistance-capacitor network, or in some cases by a simple resistor fill up tied to the collector of the complementary transistor of a simple push-pull inverter.

None of these low cost inverters have inherent power factor correction compensation. Their use then might be expected to result in higher power input requirements and lower efficiencies with the switching transistor device usually taking the brunt of the losses. The prior art teaches the use of power factor control devices particularly for regulating incoming alternating current. Related are the power factor correction circuits used with gas discharge lamps. However, there is no art in the area of power compensating DC to AC inverters for use with electroluminescent lamps.

Therefore, there is a need for a circuit in which direct current is inverted with power factor correction and a means to compensate for the changing properties of the device such as an electroluminescent lamp element within the circuit.

SUMMARY OF THE INVENTION

This invention is a circuit to invert DC to AC for the operation of electroluminescent lamps. A primary winding of a transformer is in series with a power source and the input or output of the switching device. The output of the switching device is connected back to the power source. The secondary winding of the transformer is in series with an electroluminescent lamp and the controller side of the switching device. The secondary winding doubles as both the output to the electroluminescent lamp and the feedback winding to the controller side of the switching device. The electroluminescent lamp doubles both as the load and limiting impedance to the controller side of the switching device. A diode is provided and has a cathode side connected to the end of the secondary winding opposite the electroluminescent lamp. A unique means for dimming the lamp includes a monostable multivibrator unit connected to the collector of the transistor of the switching device, a variable resistor connected to the unit, a dimming transistor having a base connected to the unit, an emitter connected to the base of the transistor of the switching device, and a collector connected to the cathode side of the diode, and a resistor wired between the base of the transistor of the switching device and the negative terminal of the source of direct electrical current, to prevent undesirable leakage of current into the base of the transistor of the switching device.

It is generally the object of this invention to provide a power factor compensating electroluminescent DC to AC inverter. More particularly, the object of the present invention is to provide an inverter circuit for use with electroluminescent lamps in which the secondary winding of the transformer doubles as both an output to the electroluminescent lamp load and a feedback winding to the controller side of the switching device. It is an object of this invention for the electroluminescent lamp to double both as a load and limiting impedance to the controller side of the switching device.

It is another object of this invention to provide a low cost inverter circuit in which the load is also the base limiting impedance.

It is a further object of the circuit of the present invention to self-compensate for changing properties of the electroluminescent lamp during its life so as to provide a constant lamp output.

It is an object of this invention to obtain one or more of the objects set forth above. These and other objects and advantages of this invention will become apparent to those skilled in the art from the following specification and claims, reference being made to the attached drawings.

DESCRIPTION OF THE PREFERRED EMBODIMENT

Figure 1:
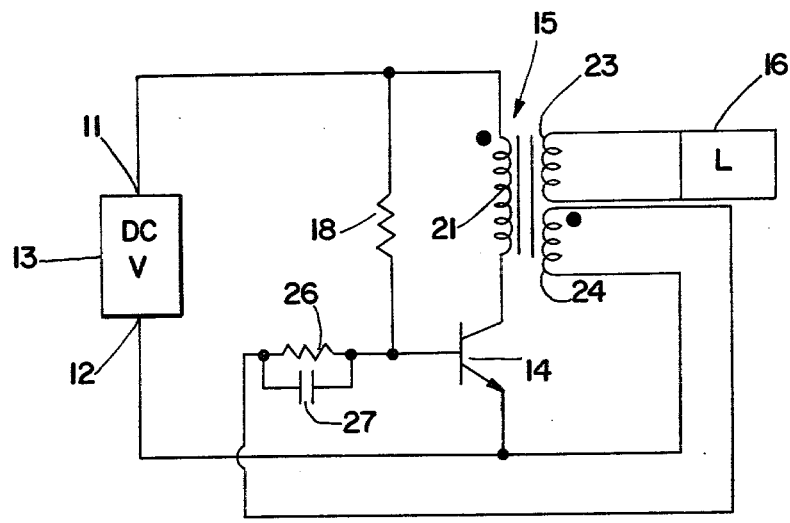
FIG. 1 is a drawing of a typical prior art DC to AC inverter.

With general reference to the drawing for like parts and particular reference to FIG. 1, there is shown a prior art DC to AC inverter circuit. Positive terminal 11 and negative terminal 12 are connected across a direct current voltage source 13. The positive terminal 11 is connected in series with one end of primary winding 21 of transformer 15. The opposite end of primary winding 21 is in series with the collector of transistor 14. The emitter of the transistor 14 is connected to negative terminal 12 which can be connected to the ground. Positive terminal 11 is connected to the base of transistor 14 through base resistor 18.

Transformer 15 has secondary load winding 23 to supply AC current for load 16. A secondary feedback winding 24 feeds current back through feedback resistor 26 and feedback capacitor 27 to the base of transistor 14.

In operation, a current flows from direct current voltage source 13, through positive terminal 11, through resistor 18 and into the base of transistor 14. Transistor 14 will start to draw collector current through primary winding 21. The current through winding 21 will produce a magnetic field which will couple through secondary windings 23 and 24. The induced voltage in secondary load winding 23 will force a current through load 16. The induced voltage in secondary feedback winding 24 will force a current flow through feedback resistor 26 and feedback capacitor 27 to the base of transistor 14.

Transistor 14 will stay on until the transformer is saturated. At that point the transistor 14 will switch off. The field in the transformer 15 then collapses reversing the current through load 16. The capacitor 27 discharges into base of transistor 14 turning it on again to repeat the cycle.

In this prior art circuit load 16 can be an electroluminescent lamp. In this circuit there is some voltage and frequency compensation during the flyback cycle to self-compensate for changes in the lamp load during the life of the lamp. However the on cycle is fixed so that there is no compensation. The electroluminescent lamp has a low power factor and this circuit does not efficiently compensate for it.

Figure 2:
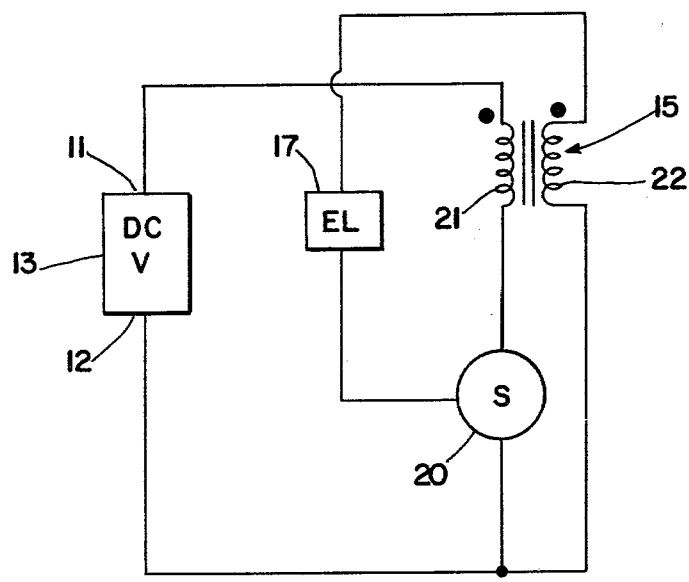
FIG. 2 is a schematic drawing of a basic circuit of the present invention.

The basic circuit of the present invention is schematically shown in FIG. 2. Although the terminals can be reversed when switching devices such as polarized relays are used, this basic embodiment will be described with first terminal 11 being positive and second terminal 12 negative for consistency with preferred embodiments to be described. Positive terminal 11 and negative terminal 12 are connected across a direct current voltage source 13. The positive terminal is connected to one end of primary winding 21 of transformer 15. The opposite end of primary winding 21 is in series with the input to switching device 20. The output of switching device 20 is connected back to direct current voltage source 13 through negative terminal 12.

Secondary winding 22 of transformer 15 is in series with electroluminescent lamp 17 and with the controller side of switching device 20. The end of secondary winding 22 opposite the controller side of switching device 20 is connected to the output line of switching device 20. The basic embodiment as shown in FIG. 1 can be alternately shown as an emitter-follower type circuit. That is, the primary winding of the transformer is in series with the output of switching device 20. Embodiments of this version of the invention are described below with reference to FIGS. 5, 6, 7 and 8.

Switching device 20 can be a PNP or an NPN transistor, a PMOS or NMOS field effect transistor, an electro-mechanical relay or a silicon control switch. As described below a transistor is the preferred switching device.

In operation, switching device 20 is turned on by a current through a starting impedance, such as a base resistor or where the switching device is a transistor having sufficient collector to base leakage. Generally, a base resistor is connected between the positive terminal 11 and the controller side of the switching device. A current then flows from direct current voltage source 13, through positive terminal 11 and primary winding 21 into switching device 20. The current through primary winding 21 will produce a magnetic field which will couple through secondary winding 22. The induced voltage in secondary winding 22 will force a current to the electroluminescent lamp 17. The electroluminescent lamp is a capacitor and becomes charged.

The switching device 20 will stay on until the capacitive electroluminescent lamp 17 is charged or the transformer is saturated, at which time the switching device will switch off. The field in the transformer 15 collapses reversing the current to the electroluminescent lamp 17 which discharges into the controlling side of the switching device 20 turning it on again to repeat the cycle.

In this circuit the secondary winding doubles both as an output to the electroluminescent lamp load and a feedback winding. The electroluminescent lamp doubles both as the load and the limiting impedance to the controller side of the switching device. The use of the electroluminescent lamp load as the controller side of the switch limiting impedance helps compensate for its own generated low power factor. As the lamp ages, its power factor will lower. Since the electroluminescent lamp is the controller side impedance of the switch drive as well as the load, the lamp will compensate the inverter for its own changing power factor. The reason for this is that as the electroluminescent lamp gets older the capacitance decreases. As the capacitance decreases, the frequency will increase thereby compensating and attaining a relatively constant light output over the life of the electroluminescent lamp. There is both voltage and frequency compensation during the on cycle as well as during the flyback cycle.

Figure 3:
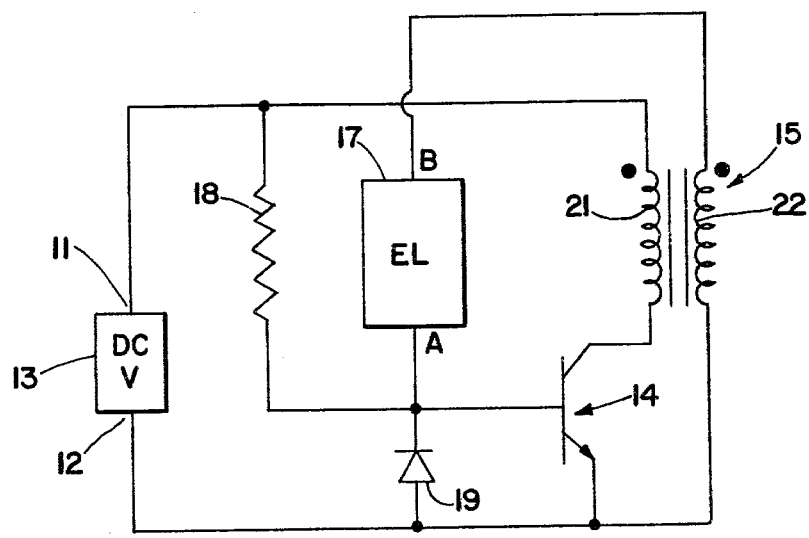
FIG. 3 is a drawing of the preferred embodiment of the circuit of the present invention.

FIG. 3 shows a preferred embodiment of the circuit of the present invention. Positive terminal 11 and negative terminal 12 are connected across a direct voltage source 13. The positive terminal 11 is connected to one end of the primary winding 21 of transformer 15. The opposite end of primary winding 21 is connected to the input of a switching device such as the collector of transistor 14. Positive terminal 11 is connected to the controller side of a switching device such as the base of transistor 14. The output of a switching device such as the emitter of transistor 14 is connected to negative terminal 12. There should be a base resistor 18 connected between the base of transistor 14 and the positive terminal 11.

Figure 4:
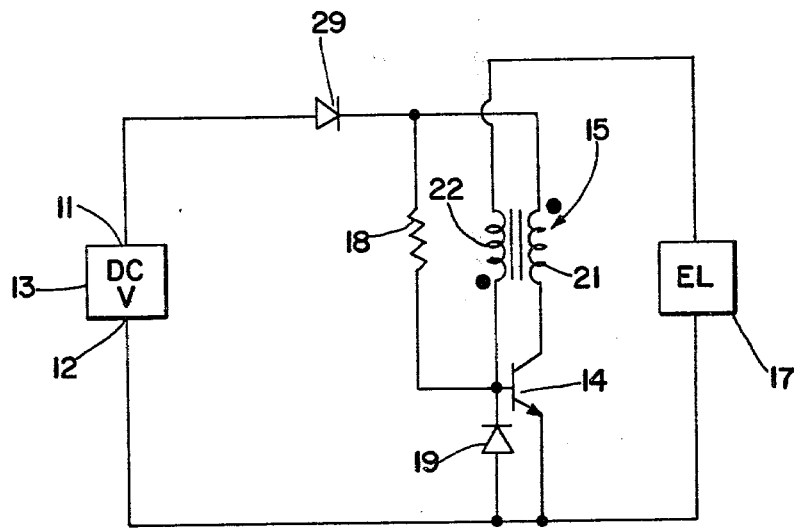
FIG. 4 is a drawing of an alternate form of the preferred embodiment of the circuit of the present invention.

The base of transistor 14 is connected to one end of secondary winding 22 of transformer 15. The opposite end of secondary winding 22 is connected to the emitter of transistor 14 and then to the base of transistor 14 as shown. There is preferably a directional diode 19 in the connection between the base of transistor 14 and the emitter of transistor 14 which permits current to pass in the direction from the opposite end of secondary winding 22 to the base of transistor 14. The emitter of transistor 14 is connected to the negative terminal from between the emitter and the direction diode 19. The electroluminescent lamp 17 is in series with the secondary winding and can be located between the connection of the base of transistor 14 to one end of the secondary winding, or the connection of the opposite end of the secondary winding 22 to the emitter of transistor 14. FIG. 3 shows the electroluminescent lamp 17 located between the base of transistor 14 and one end of secondary winding 22. FIG. 4 shows the electroluminescent lamp located between the opposite end of secondary winding 22 and the connection to the emitter of transistor 14. Finally, the negative terminal can be grounded.

In operation, when power is applied to the circuit, a small current flows through resistor 18 into the base of transistor 14. Transistor 14 starts to draw collector current through primary winding 21 of transformer 15. This current through the turns of primary winding 21 produces a magnetic field which couples through secondary winding 22. The induced voltage in secondary winding 22 forces a current through the electroluminescent lamp load 17. The electroluminescent lamp is a capacitor and becomes charged.

Transistor 14 stays on until the electroluminescent lamp is charged, or the transformer saturates or both. At that point, transistor 14 switches off. The field in the transformer reverses, charging the electroluminescent lamp capacitor with the negative voltage at point B through series diode 19. After the field in the transformer 15 has collapsed, the charge on the electroluminescent capacitor which is positive at point A discharges into base of transistor 14, forcing it on again.

The base resistor 18 is not needed once the inverter runs, because the electroluminescent lamp capacitor is now charged. Each half cycle forces the transistor on after each negative half flyback cycle. Any resistor placed in parallel with the electroluminescent lamp will speed up the discharge of the electroluminescent capacitor leaving less energy to turn on the transistor, resulting in slowing down or completely stopping the inverter. Preferably, however, a resistor 18 is needed to start or restart the circuit.

By having a reversing field going through the secondary winding 22, the charge on the electroluminescent lamp capacitor 17 is continually reversed. The continual reversal causes the necessary change in the electric field needed for operation of the electroluminescent phosphorous portion of the lamp. Therefore, in this circuit, the electroluminescent lamp is used as both the load and the limiting impedance. Further, the secondary winding 22 doubles both as the output and the feedback winding.

FIG. 4 shows an alternate form of the preferred embodiment of the present invention. This embodiment is particularly designed for use in motor vehicles although other uses such as in aircraft are practical. In this circuit, the electroluminescent lamp 17 is on the opposite side of the secondary winding when compared to the circuit in FIG. 3. However, it is still in series and the basic operation is the same. Additionally, this circuit has a second protective directional diode 29 to prevent current flow in the event the terminals 11 and 12 are inadvertently reversed. Using this circuit configuration electroluminescent lamp 17 can be located at a distance from the rest of the circuit which will maintain a compact design.

This example circuit can have the following components for an electroluminescent lamp having a capacitance of 0.01 microfarads and a resistance of 1.8K ohms. Diodes 19 and 29 are both IN4004; resistor 18 is about 250K ohms; the transistor is MC31; and the direct current voltage is 12 volts.

As noted above, there are alternate embodiment circuits having the transformer on the output side of the switching device. Where the switching device is a transistor 14 these circuits are called emitter-follower circuits. Embodiments of these circuits are shown in FIGS. 5, 6, 7 and 8.

Figure 5:
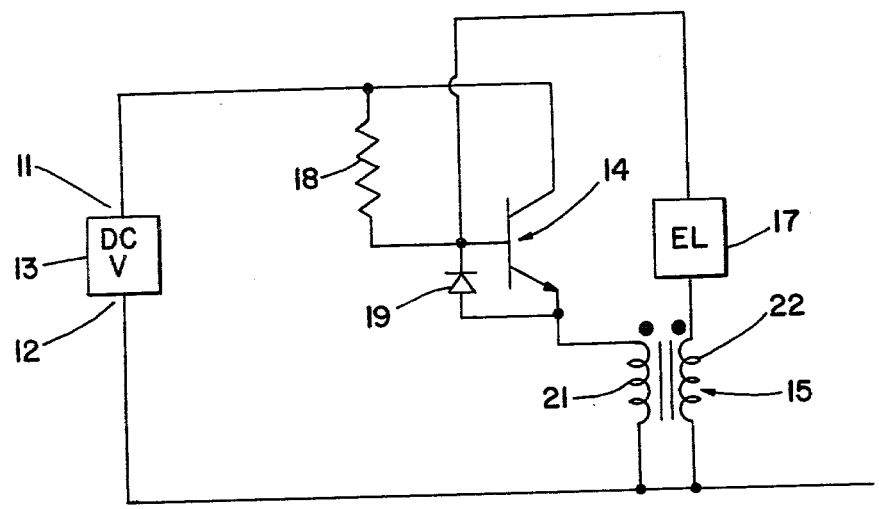
FIG. 5 is a drawing of an alternate embodiment of the present invention with the transformer on the emitter side of the transistor and with the secondary winding grounded.
Figure 6:
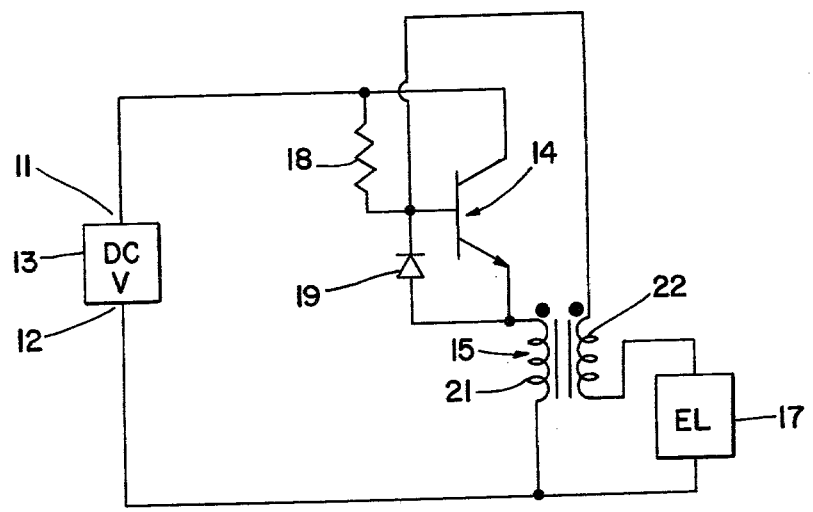
FIG. 6 is an alternate embodiment of the circuit shown in FIG. 5.

FIGS. 5 and 6 are emitter-follower circuits with one end of the secondary winding 22 connected in series to the base of the transistor and the end of the secondary winding 22 opposite the base of transistor 14 connected to a line connecting the opposite end of primary winding 21 to the negative terminal 12. Preferably negative terminal 12 is connected to ground. One end of the primary winding 21 is in series with the emitter of transistor 14. In FIG. 5 the electroluminescent lamp 17 is located between the base of transistor 14 and one end of the secondary winding. In FIG. 6 the electroluminescent lamp 17 is located between the opposite end of secondary winding and negative terminal 12. The opposite end of primary winding 21 is connected to the line between the electroluminescent lamp 17 and terminal 12.

Figure 7:
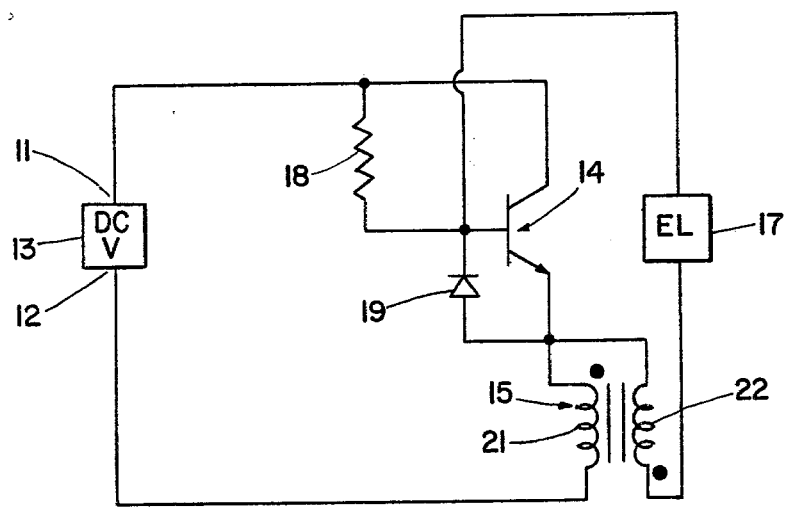
FIG. 7 is an alternate embodiment of the circuit shown in FIG. 5 without the secondary winding grounded.
Figure 8:
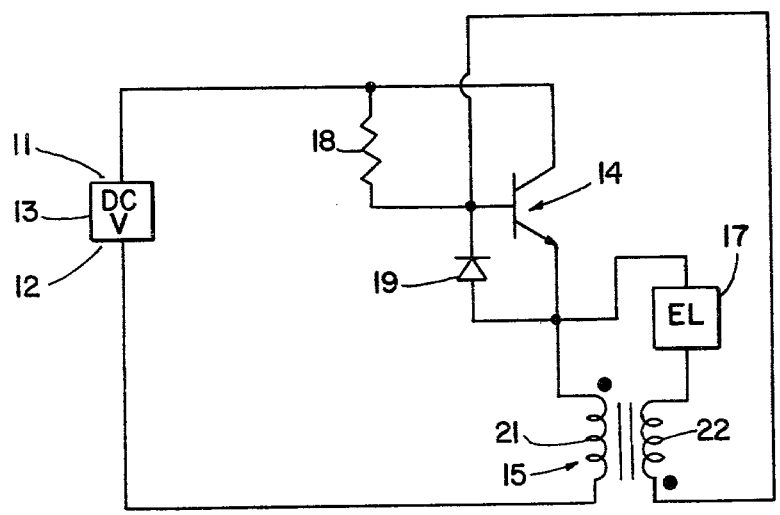
FIG. 8 is an alternate embodiment of the circuit shown in FIG. 7.

FIGS. 7 and 8 are emitter-follower circuits similar to the circuits shown in FIGS. 5 and 6. FIGS. 7 and 8 differ from FIGS. 5 and 6 in that the end of the secondary winding 22 opposite the base of transistor 14 is connected to a line between the emitter of transistor 14 and one end of primary winding 21. One end of secondary winding 22 is connected in series with the base of transistor 14. In FIG. 7 the electroluminescent lamp 17 is located between the base of transistor 14 and one end of the secondary winding. In FIG. 8 the electroluminescent lamp 17 is located between the opposite end of secondary winding 22 and the connection of the opposite end of the secondary winding to the line between the emitter of transistor 14 and one end of primary winding 21.

The operation of the circuits shown in FIGS. 5, 6, 7 and 8 are analogous to the operation of the circuits described above with reference to FIGS. 2 and 3.

Figure 10:
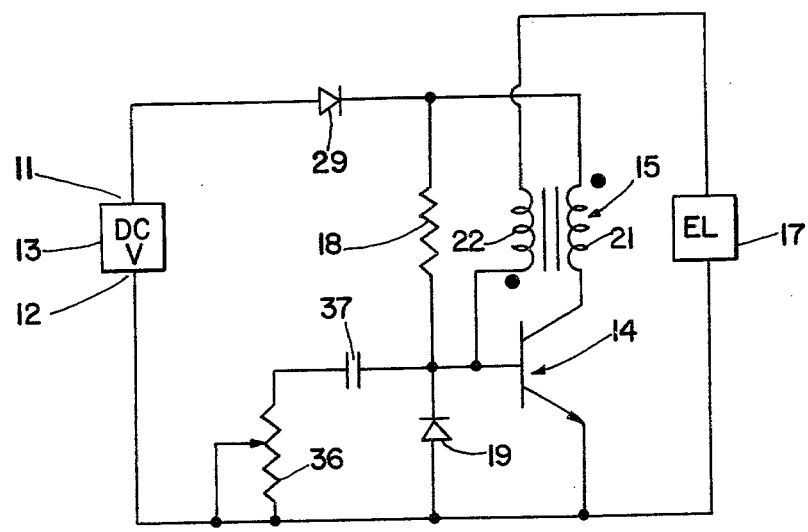
FIG. 10 is an embodiment of the present invention additionally having a second type of dimming feature.
Figure 9:
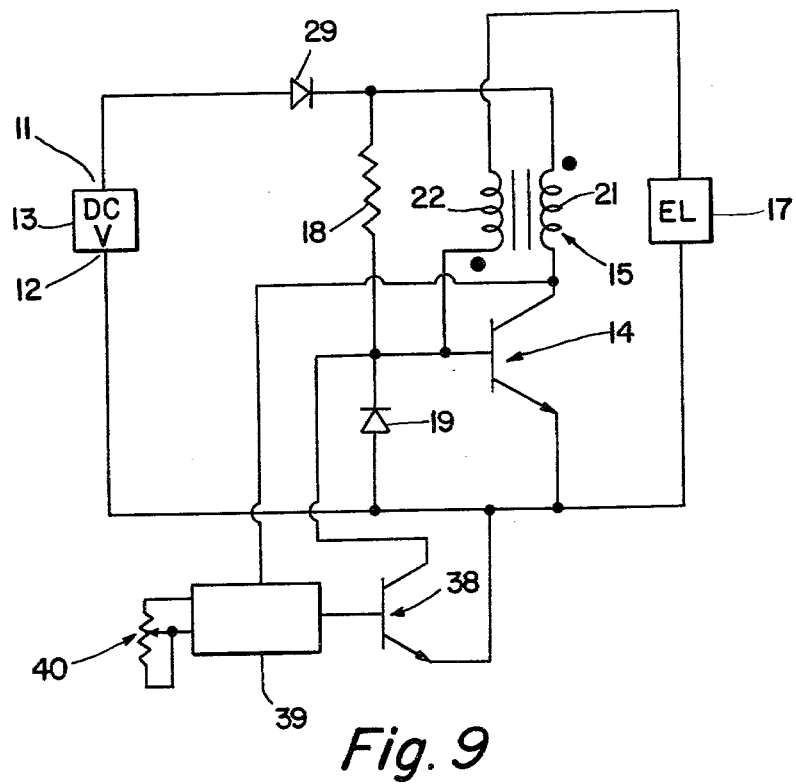
FIG. 9 is an embodiment of the present invention additionally having a dimming feature.

FIGS. 9 and 10 are two variations of FIG. 4 showing a dimming feature. Of course these dimming features can be used with the other embodiments shown and disclosed. For purposes of illustration these features are shown with the circuit of FIG. 4.

Referring to FIG. 9 a single shot unit (monostable multivibrator) 39 is connected into the circuit between the opposite end of primary winding 21 and the collector of transistor 14. This connection is preferably used to initiate the single shot unit. The single shot unit can be initiated by a connection anywhere in the circuit where there is a voltage change such as either side of secondary winding 22. A variable resistor 40 is connected to single shot unit 39. The single shot unit is connected to the base of dimming transistor 38. The collector of transistor 38 is connected to the base of transistor 14, and the emitter of transistor 38 is connected to the line connecting the emitter of transistor 14 to the negative terminal 12.

In operation, the variable resistor adjusts how long it takes for the single shot 39 to time out. The input of the single shot 39 is set, i.e., the timing cycle is started, by receiving the low voltage signal from the collector of transistor 14, which goes low when transistor 14 goes into saturation. Alternatively, the signal could also be taken from the base of transistor 14, when there is a high base voltage. When the single shot 39 times out, its output into the base of transistor 38 goes high forcing the transistor 38 on. The collector of transistor 38 will force the base of transistor 14 to the level of negative terminal 12 (preferably to ground) switching transistor 14 off. When transistor 14 is switched to off, transformer 15 goes into the flyback mode. In this manner the energy into transformer 15 is reduced, reducing the energy into the electroluminescent lamp load 17 and thereby reducing the light output. This type of dimmer which dims by reducing the energy per cycle is very smooth.

Figure 9A:
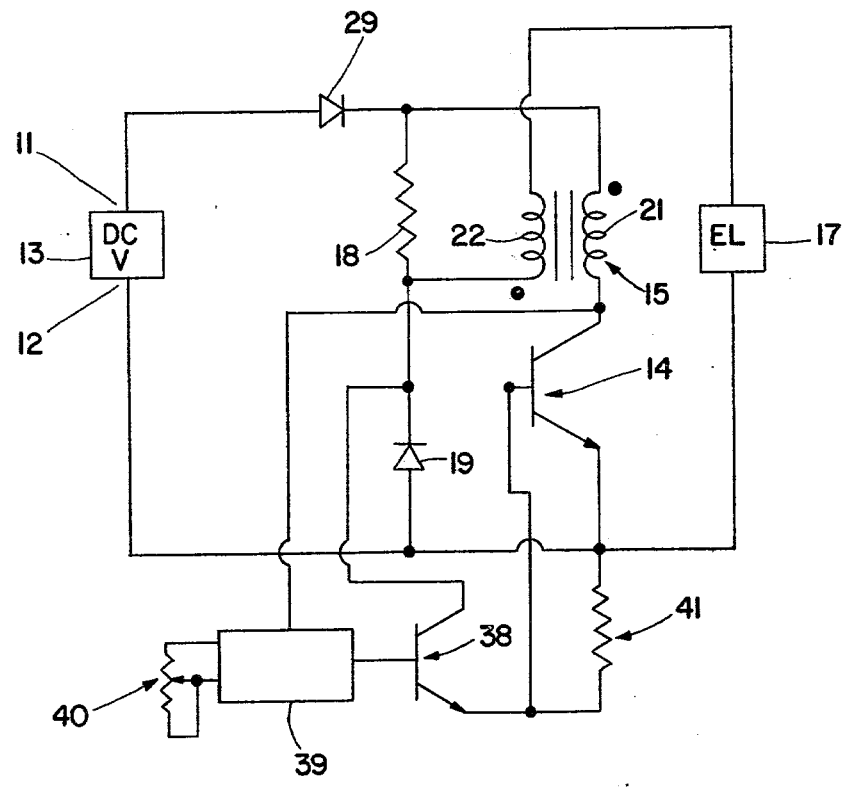
FIG. 9A is a variation of the embodiment of FIG. 9.

With reference to FIG. 9A, there is shown a variation of the embodiment of FIG. 9. The emitter, and not collector, of the dimming transistor 38, is wired or tied to the base of the main inverter transistor 14. The collector of the dimming transistor 38 is wired to the cathode side of the diode 19 between the diode and base resistor 18. The end of the secondary winding 22 opposite the electroluminescent lamp 17, is likewise wired to the cathode side of the diode 19, rather than to the base of the main inverter transistor 38.

A resistor 41 is provided to pull the base of the main inverter transistor 14 to ground, or the negative side 12 of the DC voltage supply 13 to prevent undesirable leakage of current into the base of the main inverter transistor 14, which leakage of current could turn the main inverter transistor 14 on.

When the dimming transistor 38 is turned on, the main inverter transistor 14 comes on to begin operation of the inverter. During the flyback cycle, the electrical current passing through the electroluminescent lamp 17, transformer 15 and diode 19, forces the collector of the dimming transistor 38 to the negative side 12 of the DC voltage supply 13, thereby shutting off the main inverter transistor 14. This puts the transformer 15 in the flyback mode.

If, at any time the dimming transistor 38 is turned off while the inverter is in the on cycle and the main inverter transistor 14 is on, the main inverter transistor 14 will turn off and the transformer 15, which has not yet saturated, will go in the flyback mode. Because the on cycle mode is shorter in time, with less energy, the flyback cycle will also contain less energy. The flyback cycle could have a shorter time duration, or a smaller voltage amplitude, or both. In any case, there is a reduced output or dimming of the electroluminescent lamp 17.

FIG. 10 shows a variable resistor 36 connected to a line which is connected to the negative terminal 12. There is a capacitor 37 connected between the variable resistor 36 and the base of transistor 14.

In operation when the variable resistor 36 value is large, the capacitor will have no effect on the circuit and the electroluminescent lamp will be on full bright. As the variable resistor 36 is lowered, the capacitor 37 is charged negative by the electroluminescent lamp load 17 during the flyback cycle. The transistor 14 remains off until capacitor 37 is positively charged through resistor 18. This circuit dims by reducing the duty cycle. The lowest dimming level in percent is determined by the ratio of the flicker frequency threshold, which is about 30 hertz to the maximum bright operating frequency of the particular electroluminescent lamp.

Utilizing the electroluminescent lamp load as the base drive network helps to compensate for its own generated low power factor. As the electroluminescent lamp ages, its power factor will lower. Since the lamp is the base drive as well as the load, the lamp will compensate the inverter for its own changing power factor, thereby resulting in a uniform illumination over the life of the lamp.

Modifications, changes, and improvements to the preferred forms of the invention herein disclosed, described and illustrated may occur to those skilled in the art who come to understand the principles and precepts thereof. Accordingly, the scope of the patent to be issued herein should not be limited to the particular embodiments of the invention set forth herein, but rather should be limited by the advance of which the invention has promoted the art.

What is claimed is:

1. A power factor compensating DC/AC inverter circuit which comprises:
    (a) a source of direct electrical current having a positive terminal and a negative terminal;
    (b) a lamp operable on AC current;
    (c) a switching device having an input, an output, and a controller side, the device including a single transistor having a collector as an input, an emitter as an output, and a base as a controller side;
    (d) a transformer having a primary winding and a secondary winding, the primary winding being in series with the positive terminal of the source of direct electrical current and the input to the switching device, the output of the switching device being connected to the negative terminal of the source of direct electrical current, the secondary winding being in series with the lamp and in electrical communication with the source of direct electrical current, such that the secondary winding doubles as both an output and a feedback winding and the lamp doubles as both a load and limiting impedance for the controller side of the switching device;
    (e) a first diode having a cathode side connected to the end of the secondary winding opposite the lamp;
    (f) means for dimming the lamp, including:
        (I) a monostable multivibrator unit connected to the collector of the transistor of the switching device;
        (II) a variable resistor connected to the unit;
        (III) a dimming transistor having a base connected to the unit, an emitter connected to the base of the transistor of the switching device, and a collector connected to the cathode side of the first diode; and
        (IV) a resistor wired between the base of the transistor of the switching device and the negative terminal of the source of direct electrical current, to prevent undesireable leakage of current into the base of the transistor of the switching device.

2. The circuit of claim 1, which includes a second diode having a cathode side connected to the primary winding, and a base resistor connected in series between the cathode sides of the first and second diodes.

3. The circuit of claim 2, wherein the collector of the dimming transistor is connected to the cathode side of the first diode between the first diode and base resistor.

4. The circuit of claim 3, wherein the end of the secondary winding connected to the cathode side of the first diode is connected between the first diode and base resistor.

5. The circuit of claims 1, 2, 3, or 4, wherein the lamp is an electroluminescent lamp.

* * * * *